(12) United States Patent
Etherington et al.

(10) Patent No.: US 12,071,049 B2
(45) Date of Patent: Aug. 27, 2024

(54) SEAT ADJUSTMENT MECHANISM

(71) Applicant: McLaren Automotive Limited, Surrey (GB)

(72) Inventors: John Etherington, Surrey (GB); Ruben Da Costa Mota, Surrey (GB); Terry Edwards, Surrey (GB); Bartlomeij Dzik, Surrey (GB); Thomas Conway, Surrey (GB)

(73) Assignee: McClaren Automotive Limited, Woking (GB)

( * ) Notice: Subject to any disclaimer, the term of this patent is extended or adjusted under 35 U.S.C. 154(b) by 126 days.

(21) Appl. No.: 17/743,833

(22) Filed: May 13, 2022

(65) Prior Publication Data
US 2022/0363165 A1 Nov. 17, 2022

(30) Foreign Application Priority Data

May 13, 2021 (GB) ..................................... 2106869

(51) Int. Cl.
*A47C 1/00* (2006.01)
*B60N 2/16* (2006.01)

(52) U.S. Cl.
CPC ......... *B60N 2/1695* (2013.01); *B60N 2/1615* (2013.01); *B60N 2/1665* (2013.01)

(58) Field of Classification Search
CPC .. B60N 2/1695; B60N 2/1615; B60N 2/1665; B60N 2/1635; B60N 2/164
See application file for complete search history.

(56) References Cited

U.S. PATENT DOCUMENTS 6,290,198 B1  9/2001  Seiki
7,140,682 B2 * 11/2006  Jaeger .................. B60N 2/1695
                                                   297/344.15

(Continued)

FOREIGN PATENT DOCUMENTS

DE          29824882 U1    3/2003
DE      102019122310 A1   10/2020

(Continued)

OTHER PUBLICATIONS

Search Report from Great Britain Patent Application No. 2106869.7, dated Oct. 26, 2021.
Extended European Search Report dated Oct. 18, 2022.

*Primary Examiner* — Amy J. Sterling
(74) *Attorney, Agent, or Firm* — Dergosits & Noah LLP

(57) ABSTRACT

An adjustment mechanism for a seat, the adjustment mechanism permitting the seat to be adjusted along a motion path that provides adjustment of height and/or back inclination of the seat, the mechanism comprising: a base part; a side part for attaching to the seat; a forward link mounted between the base part and the side part such that the forward link can rotate with respect to both the base part and the side part; a rear link mounted to the base part at a first position, the rear link mounted between the base part and the side part such that the rear link can rotate with respect to both the base part and the side part; an adjustment link attached to the rear link at a second position such that the adjustment link and rear link move in unison; and an adjustable strut mounted between the side part and the adjustment link such that the adjustable strut can rotate with respect to both the side part and the adjustment link, the adjustable strut being mounted to the adjustment link at a third position remote from the second position and mounted to the side part at a fourth position, the adjustable strut having a length running between the third position and the fourth position, the length (Continued)

being changeable between a minimum length and a maximum length to move the seat along the motion path by rotation of the forward and rear links with respect to the base part and side part.

23 Claims, 6 Drawing Sheets

(56) References Cited

U.S. PATENT DOCUMENTS

| | | | | |
|---|---|---|---|---|
| 7,861,994 | B2* | 1/2011 | Yamada | B60N 2/165 |
| | | | | 297/344.13 |
| 9,637,033 | B2* | 5/2017 | Fujita | B60N 2/1615 |
| 2003/0230695 | A1* | 12/2003 | Becker | B60N 3/16 |
| | | | | 248/419 |
| 2007/0216210 | A1* | 9/2007 | Kim | B60N 2/165 |
| | | | | 297/344.15 |
| 2010/0001569 | A1 | 1/2010 | Shinozaki | |
| 2012/0112503 | A1 | 5/2012 | Masutani | |

FOREIGN PATENT DOCUMENTS

| | | |
|---|---|---|
| JP | 2007230253 A | 9/2007 |
| JP | 2010285047 A | 12/2010 |
| WO | WO02066284 A1 | 8/2002 |
| WO | WO2010020567 A1 | 2/2010 |
| WO | WO2020207835 A1 | 10/2020 |

* cited by examiner

SEAT ADJUSTMENT MECHANISM

CROSS-REFERENCE TO RELATED APPLICATIONS

The present Application claims the benefit of Great Britain Patent Application No. 2106869.7, entitled "Seat Adjustment Mechanism," filed May 13, 2021. The contents of Great Britain Patent Application No. 2106869.7 are hereby incorporated by reference.

TECHNICAL FIELD

This invention relates to mechanisms for adjusting the position of a seat, for example in a vehicle.

BACKGROUND

In a conventional road-going automobile, the position of the driver's seat can be adjusted relative to the body of the vehicle so that the driver can reach the controls comfortably. Typically, the seat is attached to the floor pan of the vehicle by an adjustment mechanism. The adjustment mechanism can be operated to raise or lower the seat in a vertical direction (i.e. in the vehicle's Z axis), and often to adjust the rake of the seat base (i.e. for rotation about the vehicle's Y axis) by adjusting the height of the front and the rear of the seat base independently. The adjustment mechanism is mounted to rails that run along the floor pan in the vehicle's X direction. The adjustment mechanism can be moved along the rails to provide fore and aft positional freedom of the seat.

Typically, the seat has a seat base and a seat back which are formed as separate elements and are interconnected by a further adjustment mechanism that permits the rake of the seat back relative to the base to be adjusted. In some performance-oriented cars the seat is a bucket seat having the base and the back formed integrally with each other.

A problem with conventional seat adjustment mechanisms is that they can be heavy. In addition to the apparatus required to support the seat and provide for its motion, which are typically made of steel pressings, for each class of motion provided by the adjustment mechanism there may be an electric motor to drive the motion. These add further to the weight of the mechanism.

To reduce weight, some racing cars have a seat that is fixed in position for a particular driver. To change the position of the seat for a different driver the seat has to be unbolted and reinstalled in the new position for the new driver. This approach is unsuitable for a consumer vehicle or even for high performance vehicles where more than one driver may use the car in a relatively short period of time.

It would therefore be desirable for there to be a seat mechanism that provides for adjustment to suit different occupants but with relatively low weight.

SUMMARY OF THE INVENTION

According to a first aspect of the present invention there is provided an adjustment mechanism for a seat, the adjustment mechanism permitting the seat to be adjusted along a motion path that provides adjustment of height and/or back inclination of the seat, the mechanism comprising: a base part; a side part for attaching to the seat; a forward link mounted between the base part and the side part such that the forward link can rotate with respect to both the base part and the side part; a rear link mounted to the base part at a first position, the rear link mounted between the base part and the side part such that the rear link can rotate with respect to both the base part and the side part; an adjustment link attached to the rear link at a second position such that the adjustment link and rear link move in unison; and an adjustable strut mounted between the side part and the adjustment link such that the adjustable strut can rotate with respect to both the side part and the adjustment link, the adjustable strut being mounted to the adjustment link at a third position remote from the second position and mounted to the side part at a fourth position, the adjustable strut having a length running between the third position and the fourth position, the length being changeable between a minimum length and a maximum length to move the seat along the motion path by rotation of the forward and rear links with respect to the base part and side part.

The rear link may be mounted to the side part at the second position such that the rear link can rotate with respect to the side part. A movement of the adjustment link may cause a rotation of the rear link about the mount between the rear link and the base part. The adjustment link may be spaced from the rear link by a spacer. The spacer may run along a rotation axis defined by the mount between the rear link and the side part.

A change in length of the adjustable strut may impart a rotation on adjustment link to cause a rotation of the rear link. The attachment of the adjustment link to the rear link may mean that the adjustment link rotates about the mounting between the rear link and base part. A first line running between the second position and the third position on the adjustment link may be angled relative to a second line running between the first position and third position on the rear link. The third position may be located rearwards of the first position. The adjustable strut may be configured to lock at lengths between the minimum length and the maximum length.

The adjustable strut may have an unlocked configuration in which the length of the adjustable strut is changeable between the minimum length and the maximum length and a locked configuration in which the length of the adjustable strut is fixed, the adjustable strut may comprise a control input to change between the unlocked configuration and locked configuration. The adjustment mechanism may comprise a seat control connected to the control input to permit a user to control between the unlocked configuration and locked configuration. The seat control may be mounted to the side part. The seat control may be configured to be mounted to a vehicle panel. The adjustment mechanism may be biased so that when in the unlocked configuration the adjustable strut provides a biasing force to move towards one of the minimum or maximum length.

The adjustment mechanism may comprise one or more rails running longitudinally with respect to the base part, the base part may be mounted on the rails so that the base part can be moved longitudinally with respect to the rails. The adjustment mechanism may permit the seat to be adjusted along a motion path that provides coordinated adjustment of height and back inclination of the seat.

According to a second aspect of the present invention there is provided an adjustment device for a seat, the adjustment device permitting the seat to be adjusted along a motion path that provides adjustment of height and/or back inclination of the seat, the adjustment device comprising: two adjustment mechanisms as herein described; and a synchronisation mechanism connected to the adjustment mechanisms to coordinate movement of the two adjustment mechanisms along the motion path.

The synchronisation mechanism may comprise a linking strut that is mounted between the first adjustment link of the first adjustment mechanism and the second adjustment link of the second adjustment mechanism, the linking strut may constrain the first and second adjustment links so that the first and second adjustment links move in unison. The linking strut may be mounted to each adjustment link between the second position and the third position on the respective adjustment link. The first and second adjustment links may each comprise a first sublink and a second sublink, each sublink may be attached to the respective rear link and to the respective adjustable strut, each adjustable strut may be connected to the respective adjustment link between the first sublink and second sublink, the adjustment link passing through each first sublink and being attached to each second sublink.

According to a third aspect of the present invention there is provided a seat assembly comprising a seat and an adjustment mechanism as herein described, the adjustment mechanism being attached to the seat.

According to a fourth aspect of the present invention there is provided a seat assembly comprising a seat and an adjustment device as herein described, the adjustment device being attached to the seat.

The adjustment mechanism(s) may extend no further in a lateral direction of the seat than the seat itself and/or the adjustment mechanism(s) may extend no further in a longitudinal direction of the seat than the seat itself.

According to a fifth aspect of the present invention there is provided a vehicle comprising a seat assembly as herein described.

BRIEF DESCRIPTION OF THE DRAWINGS

The present invention will now be described by way of example with reference to the accompanying drawings. In the drawings.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
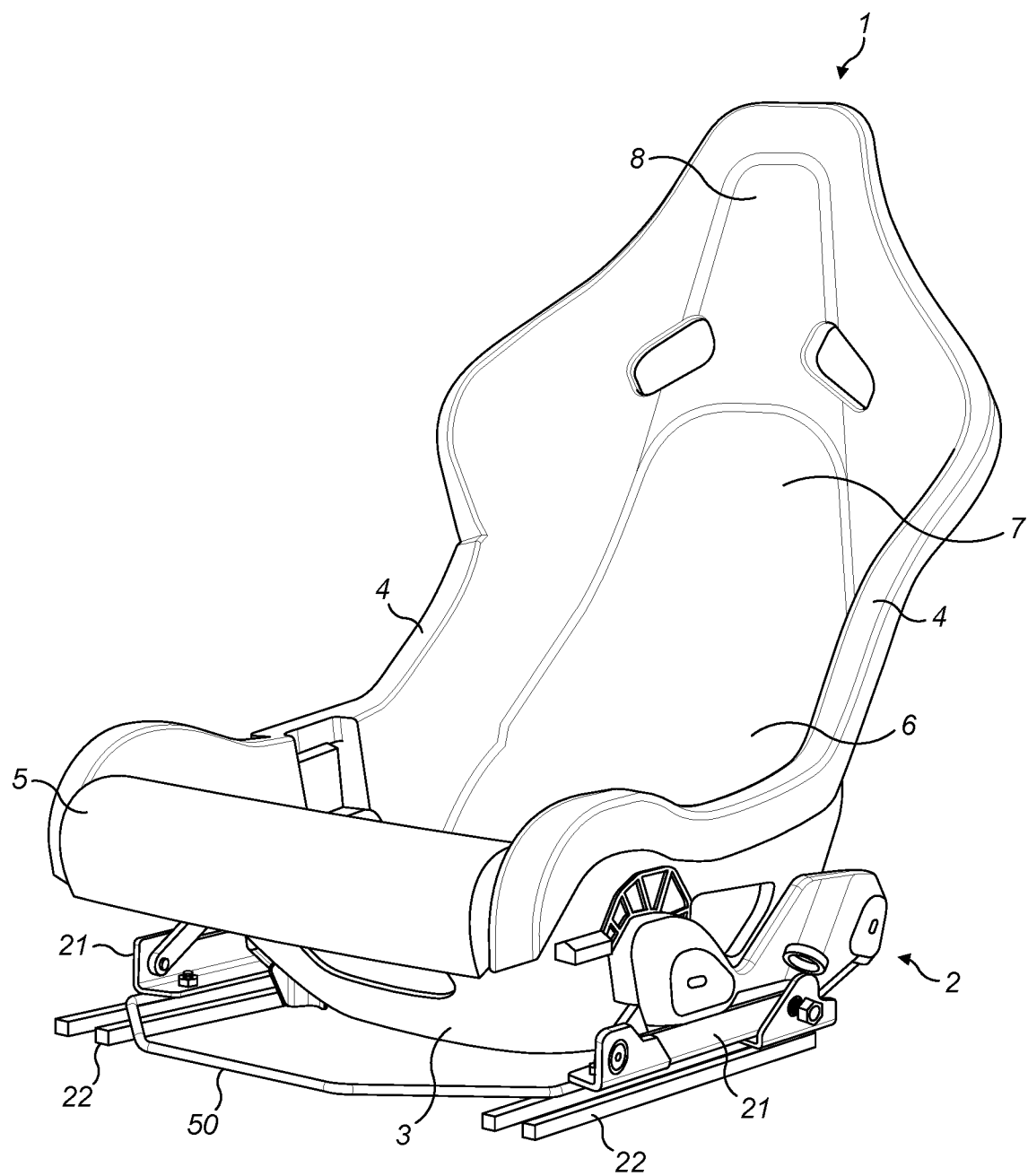
FIG. 1 shows a three quarters view of a vehicle seat attached to an adjustment device.

FIG. 1 shows a three quarters view of a vehicle seat 1 attached to an adjustment mechanism 2 for a seat. The seat 1 is a bucket seat. The seat base 3 and the seat back 4 are integral with each other. Their structure may be provided by a single piece of material, for example a fibre-reinforced plastics material such as carbon fibre. That piece may be formed as a shell. Wings 4 run along the sides of the seat, extending upwardly from the lateral edges of the base and forwards from the lateral edges of the back. These help to restrain an occupant in the seat against lateral forces. The wings may also be integral with the base and the back. The material that provides the structure of the back and base may generally be in the form of a sheet, shaped to define the contours of the seat. On the upper side of the seat base and the front side of the seat back the seat may be covered with padding such as foam and upholstery such as cloth or leather.

The seat base may be generally flat, or cupped to accommodate an occupant sitting on it. At the forward end of the base is a thigh roll 5 for supporting an occupant's thighs.

The seat back comprises a lumbar region 6 for accommodating the lumbar region of an occupant's back, a thoracic region 7 for accommodating the thoracic region of an occupant's back, and a headrest region 8 for acting as a headrest or head restraint. As illustrated in FIG. 1, the general plane of the thoracic region (and especially its laterally central strip) is angled with respect to the general plane of the lumber region (and especially its laterally central strip). The general plane of the thoracic region may be at around 20° to 40° to the general plane of the lumbar region. That angular deviation between the thoracic and lumbar regions is about a lateral axis, with the thoracic region being more upright than the lumbar region. This configuration helps to place the occupant in a comfortable position.

Figure 2:
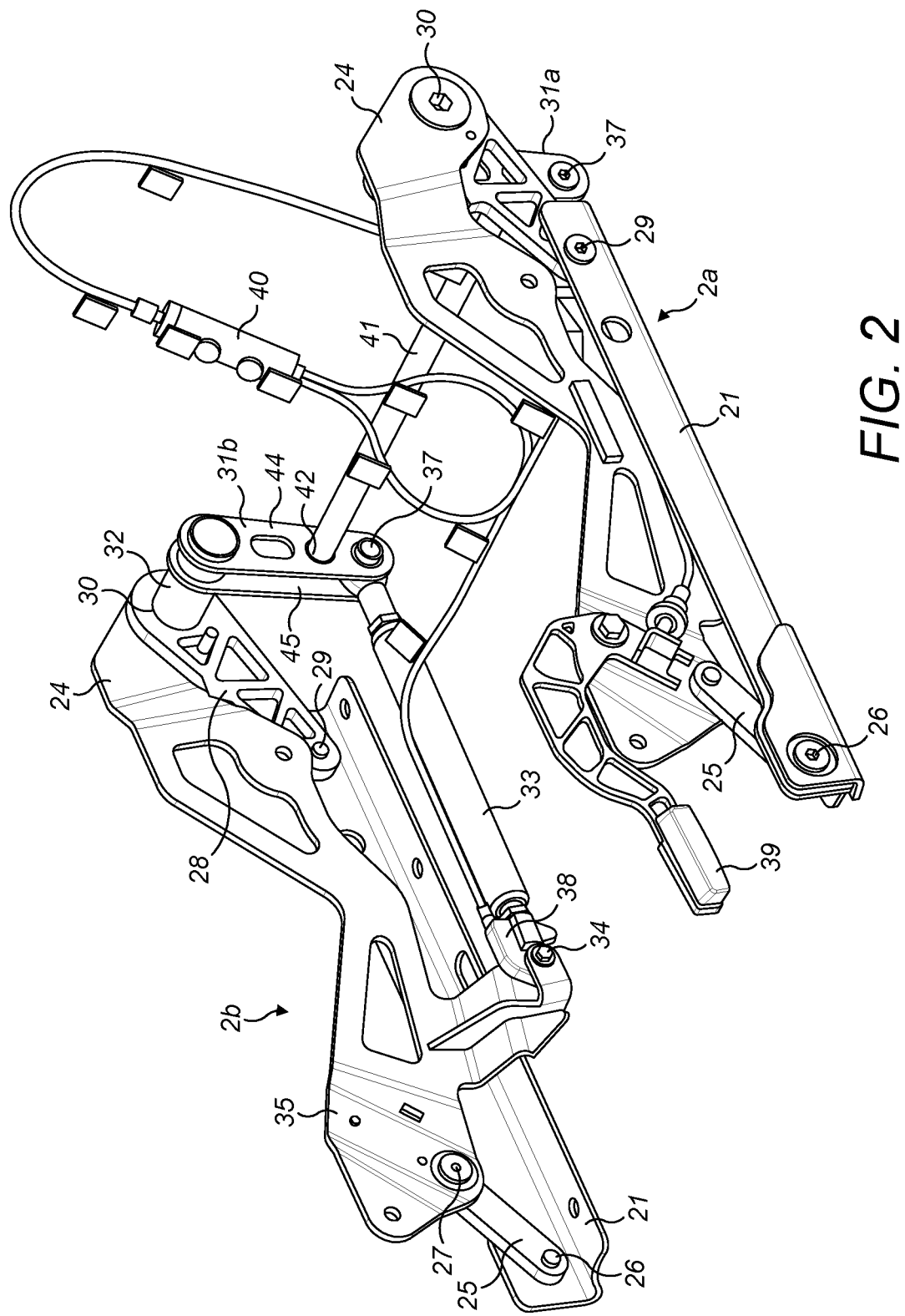
FIG. 2 shows a three-quarters view of the adjustment mechanism 2 from the front.
Figure 3:
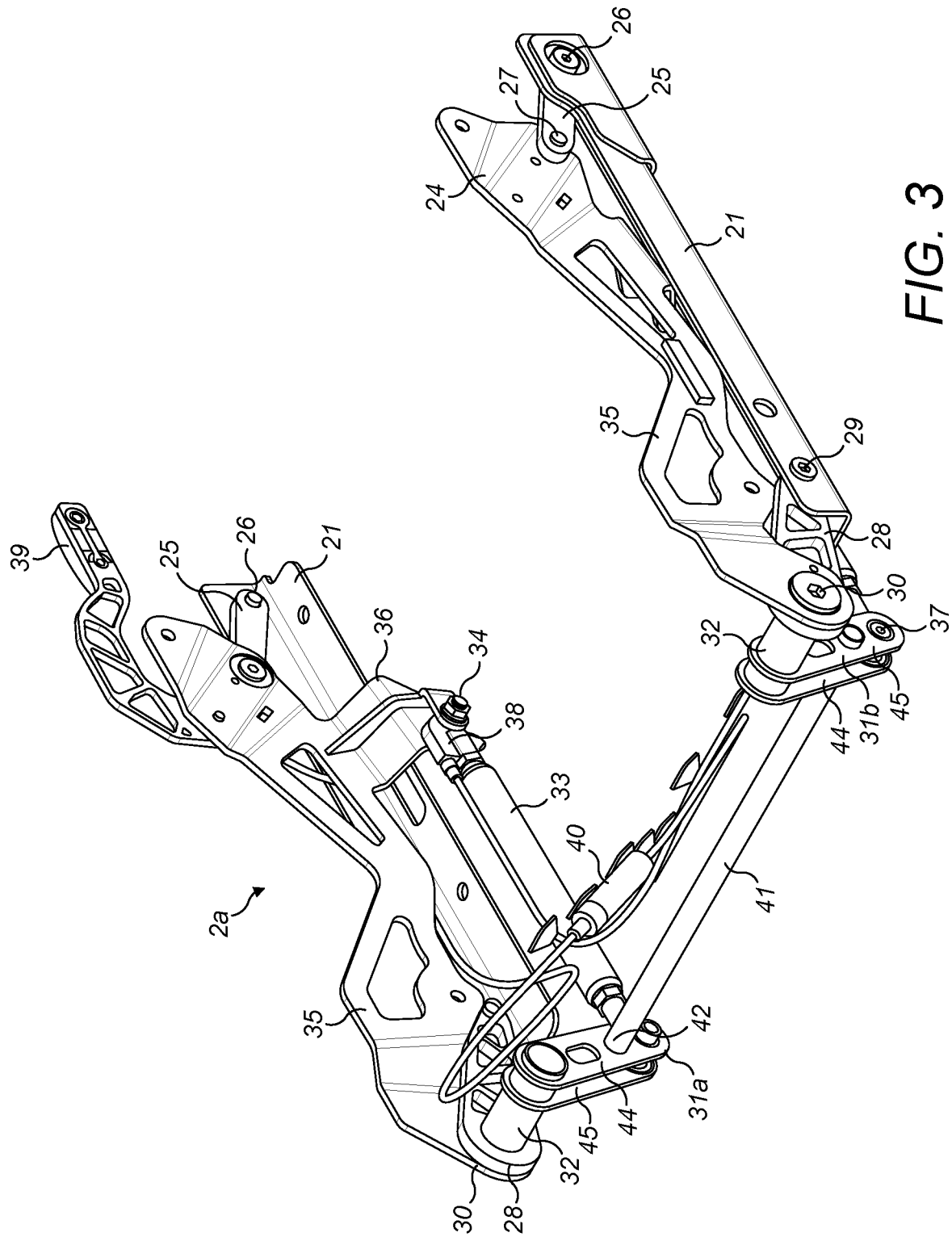
FIG. 3 shows a three-quarters view of the adjustment mechanism 2 from the rear.
Figure 4:
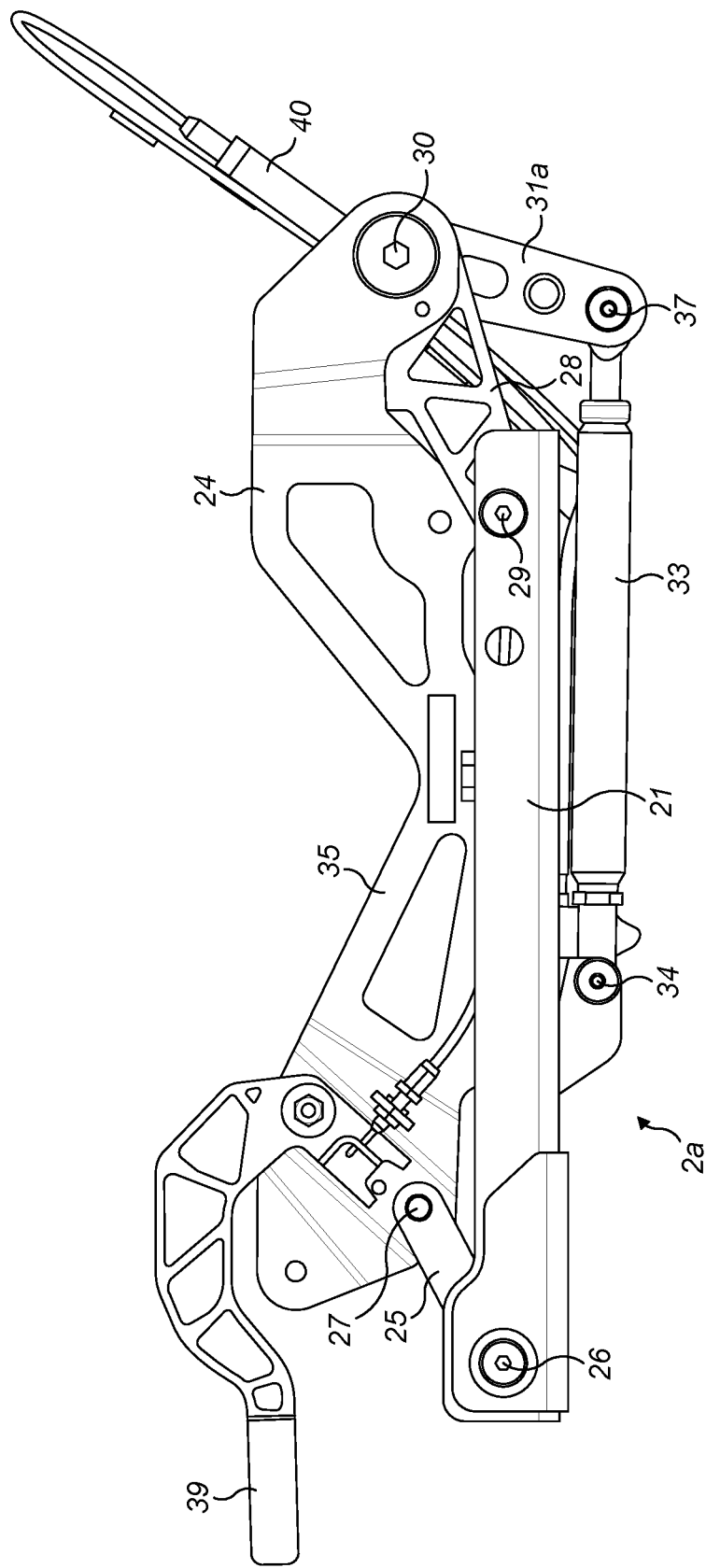
FIG. 4 shows the adjustment mechanism from one side of the seat.
Figure 5:
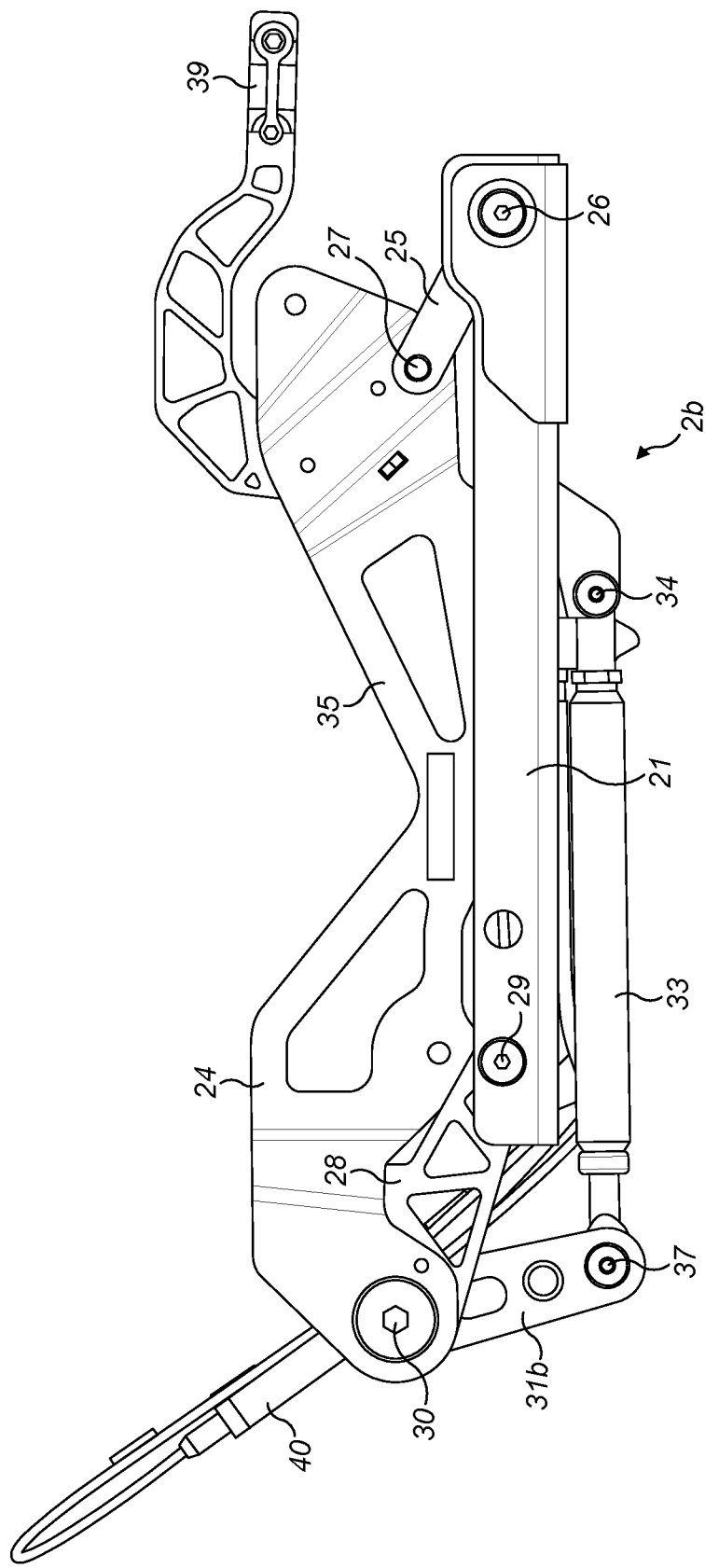
FIG. 5 shows the adjustment mechanism from the other side of the seat.

The seat is attached to the body of a vehicle by an adjustment mechanism 2. The adjustment mechanism is shown in more detail in FIGS. 2 to 5. FIG. 2 shows a three-quarters view of the adjustment mechanism 2 from the front. FIG. 3 shows a three-quarters view of the adjustment mechanism 2 from the rear. FIG. 4 shows the adjustment mechanism from one side of the seat, which from an occupant of the seat's perspective is the left-hand side. FIG. 5 shows the adjustment mechanism from the other side of the seat, which from an occupant of the seat's perspective is the right-hand side. It will be appreciated that whilst minor differences may be shown between the left and right adjustment mechanisms, they may also be identical. The seat adjustment mechanism to one side of the seat will initially be described with reference to the figures. The synchronisation mechanism between the adjustment mechanism to each side of the seat will then be described with reference to the figures.

The adjustment mechanism 2 comprises a runner 21. The runner 21 forms a base part 21 for the adjustment mechanism 2. For fore and aft motion of the seat, the runner 21 is engaged with a longitudinal rail 22 which is attached to the floor pan 23 of the vehicle in which the seat is mounted. The runner can slide along the rail and be locked in place at a desired longitudinal position. The runner can be locked and unlocked using lever 50. This allows an occupant to select a comfortable reach position. A cradle 24 is attached to the body of the seat. The cradle forms a side part 24 for attaching to the seat. The cradle is attached to the seat base. In the example of FIG. 1, the cradle is attached to the seat shell.

A forward link 25 extends between the base part 21 and the side part 24. The forward link 25 is attached to the base part 21 by a revolute joint 26. Joint 26 is located near the forward end of the base part 21. The forward link 25 is attached to the side part 24 by a revolute joint 27. Joint 27 is located near the forward end of the side part 24. The rotation axis of joints 26 and 27 are parallel and run laterally across the seat. When the seat is installed in a vehicle, these axes may be parallel to the vehicle's Y axis. Joints 26 ands 27 are spaced apart along forward link 25. The forward link 25 is rigid. It supports the forward end of the side part 24.

A rear link 28 extends between the base part 21 and the side part 24. The rear link 28 is attached to the base part 21 by a revolute joint 29. Joint 29 is located near the rear end of the base part 21. Joint 29 is located at a first position 29. The rear link 28 is attached to the side part 24 by a revolute joint 30. Joint 30 is located near the rear end of the side part. The rotation axes of joints 29 and 30 are parallel and run laterally across the seat. When the seat is installed in a vehicle, these axes may be parallel to the vehicle's Y axis. Joints 29 and 30 are spaced apart along rear link 28. The rear link 28 is rigid. It supports the rear end of the side part 24. The first position 29 may be defined in a side on view of the adjustment mechanism for example as shown in FIGS. 4 and 5.

An adjustment link 31 is attached to the rear link 28. The adjustment link 31 is attached to the rear link 28 at a second position 30. As shown in the figures, the second position 30 may be located at joint 30 which is the joint 30 that joins the side part 24 to the rear link 28. The adjustment link 31 is attached to rear link 28 so that they move in unison. In this way, adjustment link 31 and rear link 28 are rigidly attached to one another. A movement of adjustment link 31 causes a corresponding movement of rear link 28 about joint 29 which connects the base part 21 to the rear link 28. A movement of adjustment link 31 causes a rotation of rear link 28 about joint 29. I.e. the attachment point of the rear link 28 to the base part 21. The adjustment link 31 may be joined to rear link 28 along the rotation axis defined by joint 30.

Adjustment link 31 is spaced from rear link 28 by a spacer 32. This spacer 32 may be present to permit the packaging requirements of the various components and permit relative movement of the components. The spacer 32 may run along the rotation axis of joint 30 to join the rear link 28 to the adjustment link 31 at the second position 30. The spacer 32 is fixedly attached to the rear link 28. The spacer 32 is fixedly attached to the adjustment link 31. The attachment of the spacer 32 to the rear link 28 and to the adjustment link 31 is at the second position 30. The second position 30 may be defined in a side on view of the adjustment mechanism for example as shown in FIGS. 4 and 5.

An adjustable strut 33 extends between the side part 24 and the adjustment link 31. The adjustable strut 33 is attached to the adjustment link 31 by a revolute joint 37. Joint 37 is located at a third position 37. The third position 37 being remote from the second position 30. Joint 37 is located near the end of the adjustment link 31 that is remote from the attachment of the adjustment link 31 to the rear link 28. Joint 37 is located near the lower end of adjustment link 31.

The adjustable strut 33 is attached to the side part 24 by a revolute joint 34. The joint 34 is located at a fourth position 34. Joint 34 is located along the side part 24 between the joint 27 and joint 30. Thus, joint 34 is located between the attachment of the forward link 25 to the side part 24 and the attachment of the rear link 28 to the side part 24. In the example shown in the figures, the side part comprises a primary portion 35 which engages with the front and rear links and an extension 36 which extends sideways from the primary portion running between the front and rear links. The adjustable strut 33 may be attached to the extension 36. Thus, joint 34 may be located on the side extension 36. The third and fourth positions 37, 34 may be defined in a side on view of the adjustment mechanism for example as shown in FIGS. 4 and 5.

The rotation axes of joints 34 and 37 are parallel and run laterally across the seat. When the seat is installed in a vehicle, these axes may be parallel to the vehicle's Y axis. Joints 34 and 37 are spaced apart along adjustable strut 33. The adjustable strut 33 has a length running between the third and fourth positions 37, 34. The adjustable strut is configured so that the length is changeable between a minimum length and a maximum length. The changing of the length between the minimum length and the maximum length alters the distance between joints 34 and 37. This causes a movement of joint 37 on the adjustable strut relative to joint 29 which connects the rear link 28 to the base part 21. Such a movement causes the rear link 28 to rotate about joint 29. The links 25, 28, the side part 24 and the runner 21 act as a four-bar linkage supporting the body of the seat. When the angle of link 28 is changed relative to side part 24, the side part 24 moves as guided by links 25, 28. The movement of side part 24 causes the seat to move along a motion path. This motion path provides adjustment of the height and/or back inclination of an occupant sitting in the seat. The lengths of the forward link 25 and rear link 28, the difference in lengths between the two links 25, 28 and the positions of their joints with the base and side parts 21, 24 can be selected to produce the desired motion path for the seat. In this way, the amount of rotation of the seat to provide back inclination for a given height adjustment can be selected. The length of the forward link 25 and rear link 28 together with the positions of their joints with the base and side parts 21, 24 provide the overall available height adjustment. The difference between the lengths of the forward and rear links together with the positions of their joints with the base and side parts 21, 24 provide the rake adjustment.

As shown in the figures, the third position 37 is located rearward of the first position. The third position 37 may be located rearward of the first position in all rotational positions of the rear link that are permitted between the minimum and maximum length of the adjustable strut 33. The adjustment link 31 is angled relative to the rear link 28. The adjustment link 31 and rear link move in respective motion planes. The motion planes being parallel. The adjustment link is angled relative to the rear link in their respective motion planes. A first line running between the second position and the third position on the adjustment link 31 is angled relative to a second line running between the first position and third position on the rear link 28. There is a non-zero angle between these the first line and the second line. The first line and second line are non-parallel. The first and second lines run along parallel planes. The first and second lines form a V-shape. The adjustment link 31 and rear link 28 form a V-shape.

The adjustable strut 33 is configured to lock at lengths between the minimum length and the maximum length. This is so that the seat can be locked into a particular position along the motion path once selected by an occupant of the seat. The adjustable strut 33 has a locked configuration in which the length of the adjustable strut 33 is fixed. It will be appreciated that in some circumstances a small deflection in the length of the strut 33 may occur when in the locked configuration due to manufacturing tolerances within the adjustable strut 33. The adjustable strut 33 has an unlocked configuration in which the length of the adjustable strut 33 is changeable between the minimum length and the maximum length. The adjustable strut 33 may be biased so that when in the unlocked configuration the adjustable strut 33 will provide biasing force to move towards one of the minimum length or maximum length. To move the adjustable strut 33 in the opposite direction, a force larger than the biasing force needs to be applied along the length of the adjustable strut 33. Advantageously, the adjustable strut 33 is biased to move towards the maximum length. This causes the seat to move to its highest and most forward position. It has been found that it is easier for an occupant of the seat to push backwards and down on the seat against the biasing force rather than attempting to pull the seat forwards and up.

The adjustable strut 33 comprises a control input 38. The control input 38 permits control of the adjustable strut 33 between the unlocked configuration and the locked configuration. The control input 38 is connected to a seat control 39. The seat control 39 is shown as being mounted to a side part 24. This provides a convenient location for the seat control 39 as it can be positioned so that the control 39 is within reach of the occupant of the seat. However, seat control 39 could be positioned at a different location on the seat mechanism or even remote from the seat, for instance, on a vehicle panel. The seat control 39 may be connected to the control input 38 by any suitable means. As shown in the figures, seat control 39 is connected to the control input 38 by a Bowden cable. The control inputs 38 for the seat mechanisms to each side of the seat may be controlled by a single seat control 39. In this case, the seat control is connected to both control inputs 38. There may be a splitter 40 which permits connection of one seat control 39 to both control inputs 38. In the case of a Bowden cable, the splitter 40 connects a single Bowden cable from the seat control 39 to a pair of Bowden cables which run to the control inputs 38.

The adjustable strut 33 may operate using any suitable means. The adjustable strut 33 may comprise internal fluid which is used to control the motion of the adjustable strut between the minimum length and maximum length. The adjustable strut 33 may comprise a fluid lock to control the flow of fluid within the adjustable strut 33 so that the adjustable strut 33 can be locked in a particular position or allowed to move between the minimum and maximum lengths. The adjustable strut 33 may comprise a gas accumulator to provide the biasing force. The fluid may be liquid, gas or a combination of the two. The adjustable strut 33 may be a gas strut. The adjustable strut 33 may be a mechanical mechanism in which a slider moves along a rail. A latch could be provided to hold the slider stationary relative to the rail. The latch may be connected to control input 38. To move the seat, the occupant could disengage the latch and then move the seat to the desired position. A spring could be provided to help lift the seat and provide the biasing force.

The biasing provided by the adjustable strut 33 may be non-linear. The length of the adjustment link 31 and/or angle relative to the rear link 28 may be selected to provide a kinematic progression which counters the non-linear nature of the biasing. More generally, the length of the adjustment link 31 and/or angle relative to the rear link 28 may be selected to provide a desired kinematic progression which provides a desired level of resistance in a particular movement direction of the motion path. For instance, it may be selected so that less resistance is generated as the seat moves towards the lowest end of the motion path.

As shown in the figures, an adjustment mechanism is provided on each side of the seat. Thus, two adjustment mechanisms are used to adjust the position of the seat. One adjustment mechanism is attached to each side of the seat. The adjustment mechanisms may be permitted to move independently with the coordination between the movement of the adjustment mechanisms being provided by the stiffness of the seat. However, this may cause the seat to skew if the adjustable struts are not locked in exactly the same position or more force is applied to one side of the seat than the other during movement. Therefore, it is preferable for there to be a synchronisation mechanism between the two adjustment mechanisms. The combination of two adjustment mechanisms may form an adjustment device for a seat. The adjustment device may therefore comprise two adjustment mechanisms and a synchronisation mechanism to coordinate movement of the two adjustment mechanisms.

As shown in the figures, a linking strut 41 extends between the first adjustment mechanism 2a and the second adjustment mechanism 2b. The first adjustment mechanism has a first adjustment link 31a and the second adjustment mechanism has a second adjustment link 31b. The linking strut 41 extends between the first adjustment link 31a and the second adjustment link 31b. The linking strut 41 constrains the motion of both the adjustment links 31 so that they move in unison. This means that the two adjustment mechanisms 2 move in unison due to the connection of the linking strut 41.

The linking strut 41 is attached to the first adjustment link 31a between the second position 30 and the third position 37. In this way, the linking strut 41 is attached to the first adjustment link 31a between the rotation axis defined by joint 30 and the rotation axis defined by joint 37. The linking strut 41 is attached to the first adjustment link 31a so that the linking strut 41 and adjustment link 31a move in unison. The linking strut 41 is fixedly attached to the first adjustment link 31a. The linking strut 41 may be attached to the first adjustment link 31a at a fifth position 42. The fifth position 42 being along a line running between the second position 30 and the third position 37 on the first adjustment link 31a.

The linking strut 41 is attached to the second adjustment link 31b between the second position 30 and the third position 37. In this way, the linking strut 41 is attached to the second adjustment link 31b between the rotation axis defined by joint 30 and the rotation axis defined by joint 37. The linking strut 41 is attached to the second adjustment link 31b so that the linking strut 41 and adjustment link 31b move in unison. The linking strut 41 is fixedly attached to the first adjustment link 31b. The linking strut 41 may be attached to the second adjustment link 31b at a fifth position 42. The fifth position 42 being along a line running between the second position 30 and the third position 37 on the second adjustment link 31b.

In this way, the linking strut 41 is attached to each adjustment link 31 between the second position 30 and the third position 37 on the respective adjustment link 31. The linking strut 41 in attached to each adjustment link 31 between the respective rotation axis defined by joint 30 and the respective rotation axis defined by joint 37. The linking strut 41 is attached to each adjustment link 31 so that the linking strut and adjustment links move in unison. The linking strut 41 is fixedly attached to both adjustment links 31. The linking strut 41 may be attached to each adjustment link 31 at a respective fifth position 42. The respective fifth position 42 being along a line running between the second position 30 and the third position 38 on the respective adjustment link 31.

The linking strut 41 could attach to any location along the adjustment links 31. The linking strut 41 could be co-axially aligned with joints 30. However, it is advantageous if the linking strut 41 is offset from the join between the rear link 28 and the adjustment link 31. This is to improve the crash safety of the adjustment device. The offset means that there is no continuous cross member running between the two adjustment mechanisms. This provides a lateral weakness in the adjustment device which means that the adjustment device can crush laterally during an impact.

To further improve this crush ability during a crash, the linking strut 41 can be selectively attached to the adjustment links 41. As shown in the figures, the adjustment link 31 is formed of a first sublink 44 and a second sublink 45. Each sublink 44, 45 runs along the same direction. Each sublink 44, 45 is attached to the rear link 28 and to the adjustable strut 33 as described herein with reference to the adjustment link 31. The adjustable strut 33 is attached to the adjustment link 31 between the two sublinks 44, 45. In this way, one sublink 44, 45 is positioned to each side of the adjustment link 31 at joint 37. The linking strut 41 may pass through one sublink and be fixedly attached to the other sublink. The linking strut 41 may be fixedly attached to the second sublink 45. The linking strut 41 may be in contact with first sublink 44 so that the linking strut 41 can impart motion to the first sublink 41. First sublink 44 may comprise a through hole through which linking strut 41 passes. The linking strut 41 may be free to move through first sublink 44 along a direction parallel to the rotation axis of joint 37 but constrained to move with first sublink 44 during motion of the first sublink 44 long a direction perpendicular to the rotation axis of joint 37.

Both the first sublink 44 and second sublink 45 may be fixedly attached to the rear link 30. Either directly or via spacer 32 as described herein.

The fixedly connections between parts may be made, for example, by welding, gluing, or bolting.

Figure 6:
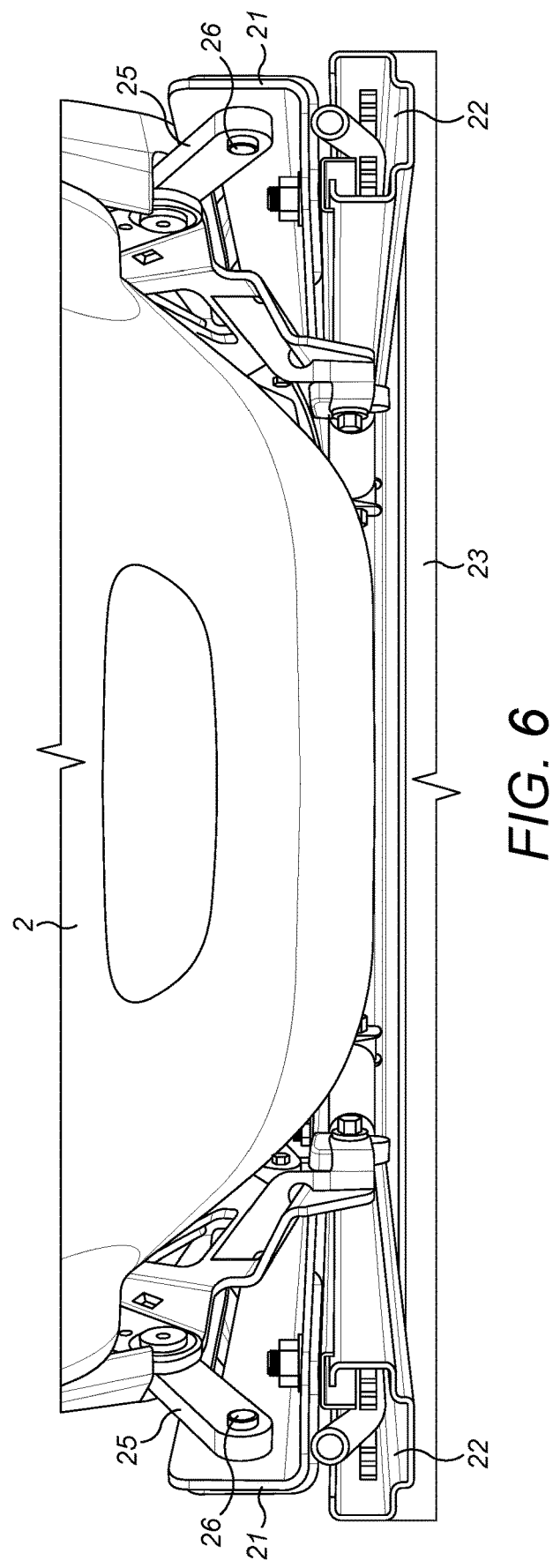
FIG. 6 shows a front view of the seat with the adjustment device attached.

FIG. 6 shows a front view of the seat 1 with the adjustment mechanisms 2 attached. The adjustment mechanisms 2 are shown as being attached to a schematic vehicle floor 23. As shown in FIGS. 1 and 6, the adjustment mechanisms 2 when fitted to the seat 1 extend no further in a lateral direction than the seat extension in the lateral direction. As also shown in FIGS. 1 and 6, the adjustment mechanisms 2 when fitted to the seat 1 extend no further in a longitudinal direction than the seat extension in the longitudinal direction. Stated differently, the adjustment mechanisms 2 when fitted to the seat 1 are confined to an area within the downwards projection of the seat. This is because the adjustment mechanism 2 described herein is particularly compact. The adjustment mechanism 2 fits around the external contours of the seat 1. For instance, there are no components of the adjustment mechanisms 2 present under the bottom of the seat base. Also, the linking strut passes behind the rear of the seat. This is instead of running underneath the seat. This is particularly important in bucket seats where it is desirable for the occupant to be positioned as close to the vehicle floor 23 as possible.

Seats configured with the adjustment mechanism described herein may be used in any suitable application, for example in land vehicles, boats, aircraft and theatres. The seat may be a driver's seat. The seat may be a passenger's seat. It may be in the front row of seats in a vehicle. It may be in a rear row of seats in a vehicle.

The seat shown in the figures is a bucket seat. The mechanism described above could be used with a seat having a greater range of adjustment: for example, adjustment of the base to back angle.

The terms "forward", "rearward" and similar terms should be understood with respect to an occupant sitting normally in the seat.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An adjustment device for a seat, the adjustment device permitting the seat to be adjusted along a motion path that provides adjustment of height and/or back inclination of the seat, the adjustment device comprising:
    two adjustment mechanisms, each adjustment mechanism comprising:
    a base part;
    a side part for attaching to the seat;
    a forward link mounted between the base part and the side part such that the forward link can rotate with respect to both the base part and the side part;
    a rear link mounted to the base part at a first position, the rear link mounted between the base part and the side part such that the rear link can rotate with respect to both the base part and the side part;
    an adjustment link attached to the rear link at a second position such that the adjustment link and rear link move in unison;
    an adjustable strut mounted between the side part and the adjustment link such that the adjustable strut can rotate with respect to both the side part and the adjustment link, the adjustable strut being mounted to the adjustment link at a third position remote from the second position and mounted to the side part at a fourth position, the adjustable strut having a length running between the third position and the fourth position, the length being changeable between a minimum length and a maximum length to move the seat along the motion path by rotation of the forward and rear links with respect to the base part and side part; and
    a synchronisation mechanism connected to the adjustment mechanisms to coordinate movement of the two adjustment mechanisms along the motion path.

2. An adjustment device as claimed in claim 1, wherein the rear link is mounted to the side part at the second position such that the rear link can rotate with respect to the side part.

3. An adjustment device as claimed in claim 1, wherein a movement of the adjustment link causes a rotation of the rear link about the mount between the rear link and the base part.

4. An adjustment device as claimed in claim 1, wherein the adjustment link is spaced from the rear link by a spacer.

5. An adjustment device as claimed in claim 4, wherein the spacer runs along a rotation axis defined by the mount between the rear link and the side part.

6. An adjustment device as claimed in claim 1, wherein a change in length of the adjustable strut imparts a rotation on adjustment link to cause a rotation of the rear link.

7. An adjustment device as claimed in claim 1, wherein the attachment of the adjustment link to the rear link means that the adjustment link rotates about the mounting between the rear link and base part.

8. An adjustment device as claimed in claim 1, wherein a first line running between the second position and the third position on the adjustment link is angled relative to a second line running between the first position and third position on the rear link.

9. An adjustment device as claimed in claim 1, wherein the third position is located rearwards of the first position.

10. An adjustment device as claimed in claim 1, wherein the adjustable strut is configured to lock at lengths between the minimum length and the maximum length.

11. An adjustment device as claimed in claim 1, wherein the adjustable strut has an unlocked configuration in which the length of the adjustable strut is changeable between the minimum length and the maximum length and a locked configuration in which the length of the adjustable strut is fixed, the adjustable strut comprising a control input to change between the unlocked configuration and locked configuration.

12. An adjustment device as claimed in claim 11, the adjustment mechanism comprising a seat control connected to the control input to permit a user to control between the unlocked configuration and locked configuration.

13. An adjustment device as claimed in claim 11, wherein the adjustment mechanism is biased so that when in the unlocked configuration the adjustable strut provides a biasing force to move towards one of the minimum or maximum length.

14. An adjustment device as claimed in claim 1, the adjustment mechanism comprising one or more rails running longitudinally with respect to the base part, the base part being mounted on the rails so that the base part can be moved longitudinally with respect to the rails.

15. An adjustment device as claimed in claim 1, wherein the adjustment mechanism permits the seat to be adjusted along a motion path that provides coordinated adjustment of height and back inclination of the seat.

16. An adjustment device as claimed in claim 8, wherein the synchronisation mechanism comprises a linking strut that is mounted between the first adjustment link of the first adjustment mechanism and the second adjustment link of the second adjustment mechanism, the linking strut constraining the first and second adjustment links so that the first and second adjustment links move in unison.

17. An adjustment device as claimed in claim 16, wherein the linking strut is mounted to each adjustment link between the second position and the third position on the respective adjustment link.

18. An adjustment device as claimed in claim 16, wherein the first and second adjustment links each comprise a first sublink and a second sublink, each sublink being attached to the respective rear link and to the respective adjustable strut, each adjustable strut being connected to the respective adjustment link between the first sublink and second sublink, the adjustment link passing through each first sublink and being attached to each second sublink.

19. A seat assembly comprising a seat and an adjustment device attached to the seat, the adjustment device permitting the seat to be adjusted along a motion path that provides adjustment of height and/or back inclination of the seat, the adjustment device comprising:
two adjustment mechanisms, each adjustment mechanism comprising:
a base part;
a side part for attaching to the seat;
a forward link mounted between the base part and the side part such that the forward link can rotate with respect to both the base part and the side part;
a rear link mounted to the base part at a first position, the rear link mounted between the base part and the side part such that the rear link can rotate with respect to both the base part and the side part;
an adjustment link attached to the rear link at a second position such that the adjustment link and rear link move in unison; and
an adjustable strut mounted between the side part and the adjustment link such that the adjustable strut can rotate with respect to both the side part and the adjustment link, the adjustable strut being mounted to the adjustment link at a third position remote from the second position and mounted to the side part at a fourth position, the adjustable strut having a length running between the third position and the fourth position, the length being changeable between a minimum length and a maximum length to move the seat along the motion path by rotation of the forward and rear links with respect to the base part and side part; and
a synchronisation mechanism connected to the adjustment mechanisms to coordinate movement of the two adjustment mechanisms along the motion path.

20. A seat assembly according to claim 19, wherein the adjustment mechanism(s) extend no further in a lateral direction of the seat than the seat itself and/or the adjustment mechanism(s) extend no further in a longitudinal direction of the seat than the seat itself.

21. A vehicle comprising a seat assembly comprising a seat and an adjustment device attached to the seat, the adjustment device permitting the seat to be adjusted along a motion path that provides adjustment of height and/or back inclination of the seat, the adjustment device comprising:
two adjustment mechanisms, each adjustment mechanism comprising:
a base part;
a side part for attaching to the seat;
a forward link mounted between the base part and the side part such that the forward link can rotate with respect to both the base part and the side part;
a rear link mounted to the base part at a first position, the rear link mounted between the base part and the side part such that the rear link can rotate with respect to both the base part and the side part;
an adjustment link attached to the rear link at a second position such that the adjustment link and rear link move in unison;
an adjustable strut mounted between the side part and the adjustment link such that the adjustable strut can rotate with respect to both the side part and the adjustment link, the adjustable strut being mounted to the adjustment link at a third position remote from the second position and mounted to the side part at a fourth position, the adjustable strut having a length running between the third position and the fourth position, the length being changeable between a minimum length and a maximum length to move the seat along the motion path by rotation of the forward and rear links with respect to the base part and side part; and
a synchronisation mechanism connected to the adjustment mechanisms to coordinate movement of the two adjustment mechanisms along the motion path.

22. An adjustment device as claimed in claim 17, wherein the first and second adjustment links each comprise a first sublink and a second sublink, each sublink being attached to the respective rear link and to the respective adjustable strut, each adjustable strut being connected to the respective adjustment link between the first sublink and second sublink, the adjustment link passing through each first sublink and being attached to each second sublink.

23. An adjustment device as claimed in claim 3, wherein the adjustment link is spaced from the rear link by a spacer.

* * * * *